(12) United States Patent
Kishikawa et al.

(10) Patent No.: US 7,211,201 B2
(45) Date of Patent: May 1, 2007

(54) ANTIFERROELECTRIC LIQUID CRYSTAL AND ITS MANUFACTURING METHOD

(75) Inventors: Keiki Kishikawa, Chiba (JP); Makoto Yamamoto, Chiba (JP); Shigeo Kohmoto, Chiba (JP)

(73) Assignee: Japan Science and Technology Agency, Saitama (JP)

( * ) Notice: Subject to any disclaimer, the term of this patent is extended or adjusted under 35 U.S.C. 154(b) by 325 days.

(21) Appl. No.: 10/515,813

(22) PCT Filed: May 23, 2003

(86) PCT No.: PCT/JP03/06478

§ 371 (c)(1),
(2), (4) Date: Nov. 24, 2004

(87) PCT Pub. No.: WO03/099960

PCT Pub. Date: Dec. 4, 2003

(65) Prior Publication Data
US 2005/0156142 A1 Jul. 21, 2005

(30) Foreign Application Priority Data
May 29, 2002 (JP) .............................. 2002-156506

(51) Int. Cl.
C09K 19/52 (2006.01)
C09K 19/20 (2006.01)
C09K 19/12 (2006.01)

(52) U.S. Cl. ..................... 252/299.01; 252/299.64; 252/299.65; 252/299.66; 252/299.67

(58) Field of Classification Search ........... 252/299.01, 252/299.64, 299.65, 299.66, 299.67
See application file for complete search history.

(56) References Cited

U.S. PATENT DOCUMENTS 5,316,694 A 5/1994 Murashiro et al.

(Continued)

FOREIGN PATENT DOCUMENTS

EP 1215195 * 6/2002

(Continued)

OTHER PUBLICATIONS

CAPLUS 2000: 433692.*

(Continued)

*Primary Examiner*—Shean C Wu
(74) *Attorney, Agent, or Firm*—Westerman, Hattori, Daniels & Adrian, LLP.

(57) ABSTRACT

Rod-like molecules (1) are admixed into a smectic C liquid crystal (2). According to the least-energy principle for electrostatic energy each rod-like molecule (1) has its permanent dipole moment aligned in a direction along a boundary layer between adjacent molecular layers of the liquid crystal and such permanent dipoles in adjacent boundary layers are aligned with their dipole moments opposed to each other in the direction of orientation. The character "<" bar regions of rod-like molecules (1) cause liquid crystal molecules inclined along their major axes to be axially inclined in an opposite direction every other layer whereby a smectic $C_A$ phase is formed in which the layer of liquid crystal molecules inclined in one direction and the layer of those inclined in the other direction alternate. Using a chiral smectic $C_A$ liquid crystal formed from chiral smectic C-phase liquid crystal molecules by substituting a terminal group of each such molecule with an optically active group gives rise to an antiferroelectric liquid crystal.

6 Claims, 11 Drawing Sheets

U.S. PATENT DOCUMENTS 6,924,009 B2 * 8/2005 Jakli et al. .................. 428/1.1

FOREIGN PATENT DOCUMENTS

| | | |
|---|---|---|
| JP | 8-82778 | 3/1996 |
| JP | 8-217728 | 8/1996 |
| JP | 8-333575 | 12/1996 |

OTHER PUBLICATIONS

CAPLUS 2003: 580296.*

* cited by examiner

X=CF₃ , R=Alkyl (b)

ANTIFERROELECTRIC LIQUID CRYSTAL AND ITS MANUFACTURING METHOD

TECHNICAL FIELD

The present invention relates to an antiferroelectric liquid crystal that develops antiferroelectricity on the basis of novel principles of operation, and a method of its manufacture.

BACKGROUND ART

Demands for liquid crystals as they are represented by TV screens and computer displays know no limits. Most of currently used liquid crystals are of nematic liquid crystal phase and account for 99% of their total. The rest 1% of them are those of chiral smectic C-type liquid crystal phase which are called ferroelectric liquid crystals and used in components such as finders for video cameras that require high speed responsiveness.

By the way, the currently used nematic liquid crystals leave much to be desired in that they are slow in switching speed, get blurred and have a preceding image left for a moment. In order to solve these problems, vigorous research and development works are underway for a next-generation liquid crystal having high speed responsiveness and enhanced functionalities.

A ferroelectric liquid crystal is about 1000 times as high in switching speed as a nematic liquid crystal, wider in the angular field of view and more power-saving. Having also a memory function, it is expected as a next-generation liquid crystal.

Further, an antiferroelectric liquid crystal in addition to having properties of a ferroelectric crystal has a capability of gray display and is much expected as a next-generation liquid crystal. An antiferroelectric liquid crystal has the problem, however, that it is hard to synthesize.

Let us explain the problems of these conventional liquid crystal in greater detail below.

Figure 9:
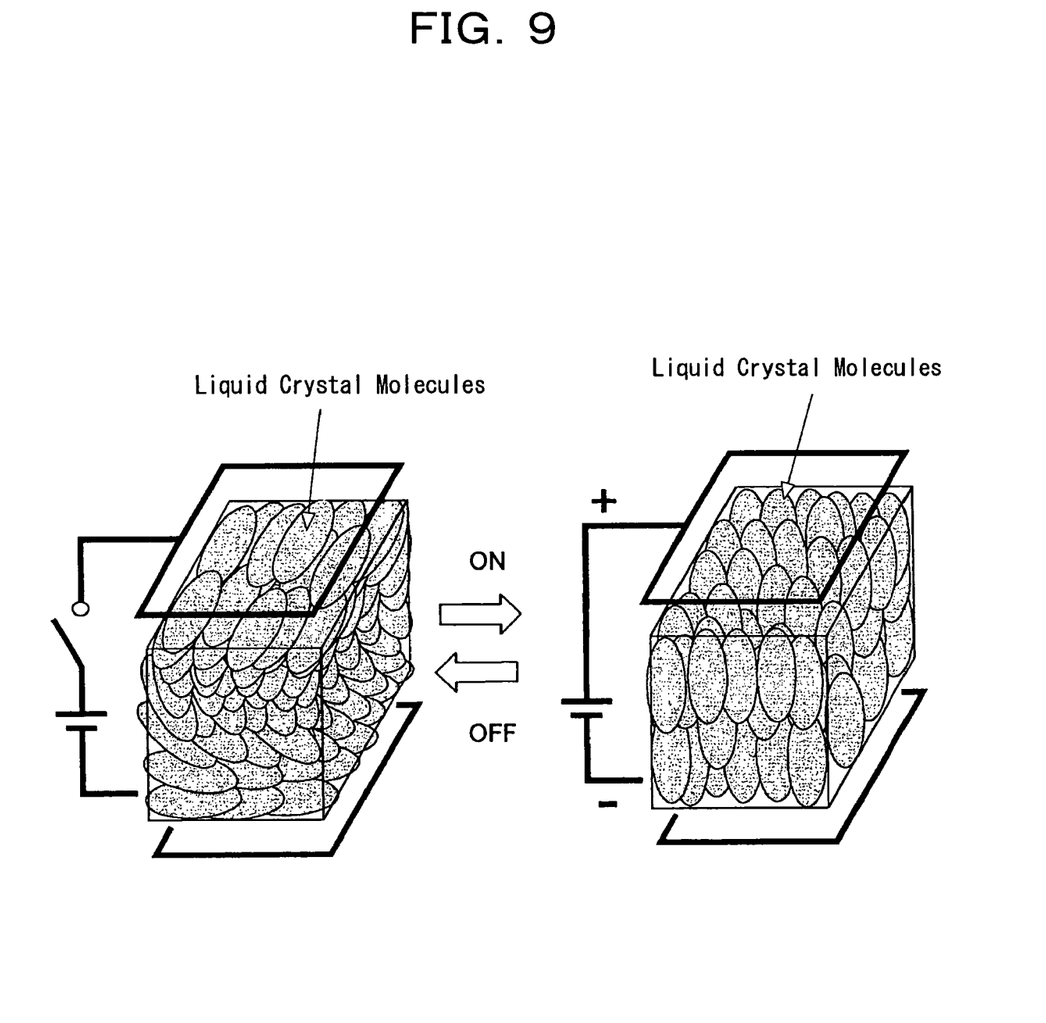
FIG. 9 is a diagram illustrating the principles of operation of a nematic type liquid crystal display device conventionally in use.

FIG. 9 is a diagram illustrating the principles of operation of a nematic type liquid crystal display device currently in use. The liquid crystal display devices most widely used at present make use of a liquid crystal phase, called the nematic phase, as shown in FIG. 9 in which liquid crystal molecules are arrayed in low order. Applying an electric field to the liquid crystal phase in a display device between a pair of electrodes causes elongate rod-like liquid crystal molecules to move changing their state from one in which they are oriented parallel to the electrodes to one in which they are oriented perpendicular to the electrodes. Light switching in the device can thus be effected utilizing such movement of the molecules and their reversed movement. The liquid crystal phase in this case in which liquid crystal molecules are simply rod-like is easy in molecular design and also easy to synthesize and hence can be applied to a variety of liquid crystal molecular species. However, reorienting these molecules requires large energy, namely a large voltage, which in turn also reduces the switching speed of the device to as low as several to several tens milliseconds.

Mention is next made of a ferroelectric liquid crystal device. In a liquid crystal phase called the smectic C-phase, liquid crystal molecules are arranged in layers and molecules in each layer have their major axes each inclined at a fixed angle to a normal to the layer. In a liquid crystal phase called the chiral smectic C phase, a chiral group is introduced to a terminal group of the smectic C-type liquid phase molecule and the chiral group has a permanent dipole added thereto. It is the chiral smectic C phase which a ferroelectric liquid crystal display device uses.

Figure 10:
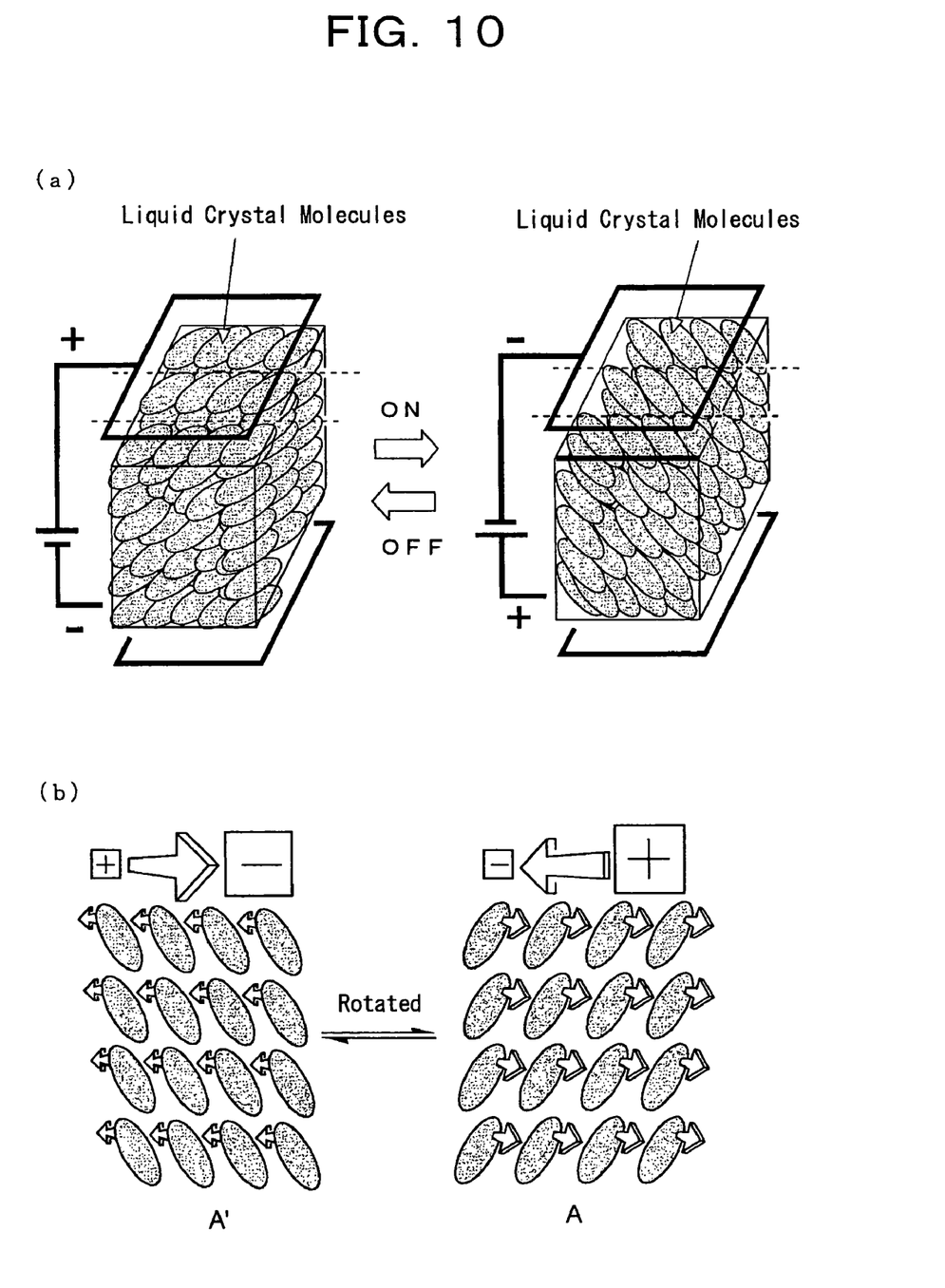
FIG. 10 is a diagram illustrating the principles of operation of a conventional ferroelectric liquid crystal display device wherein (a) shows the makeup of liquid crystal molecules and (b) shows the rotation of ferroelectric liquid crystal molecules under an applied electric field.

FIG. 10 is a diagram illustrating the principles of operation of a ferroelectric liquid crystal display device. As shown in FIG. 10(a), a ferroelectric liquid crystal display device uses the chiral smectic C phase. Applying an electric filed to this liquid crystal phase allows light to be switched. As shown in FIG. 10(b), in the chiral smectic C phase, liquid crystal molecules are formed in layers and molecules in each layer have their major axes each inclined at a fixed angle to a normal to the layer. Each of these liquid crystal molecules has a permanent dipole at a chiral group thereof, and the orientation of its spontaneous polarization is rotated according to the direction in which an electric filed is applied. For example, FIG. 10(b) shows at A' that an electric field is applied directed from the back side of the sheet of paper towards its front side (as indicated by the large arrow in the Figure). Then, liquid crystal molecules in each layer are rotated about their respective axes normal to the layer with their spontaneous polarization oriented towards the back side of the sheet of paper (as indicated by the small arrows in the Figure). It is shown also at A that an electric field is applied directed from the front side of the sheet of paper towards its back side (as indicated by the large arrow in the Figure). Then, liquid crystal molecules in each layer are rotated about their respective axes normal to the layer with their spontaneous polarizations oriented towards the front side of the sheet of paper (as indicated by the small arrows in the Figure). The orientation of a spontaneous polarization can thus be inverted by inverting the direction in which an electric field is applied, and this can be used to switch or selectively transmit and block a ray of light. Also, with this inversion effected by the rotation of liquid crystal molecules about axes normal to their layer as mentioned above, the device can be driven rapidly and at low voltage, giving rise to a switching speed about 1000 times higher than can be achieved with the nematic phase. Further, since the spontaneous polarization once oriented in a given sign remains so oriented even if the electric field is removed, the device is provided with a memory function.

Mention is next made of an antiferroelectric display device. In a liquid crystal phase called the smectic $C_A$-phase, liquid crystal molecules are arranged in layers, molecules in each layer have their major axes each inclined at a fixed angle to a normal to the layer and they are so inclined in an opposite direction every other layer. In a liquid crystal phase called the chiral smectic $C_A$ phase, a chiral group is introduced to a terminal group of a smectic $C_A$-type liquid phase molecule and the chiral group has a permanent dipole added thereto. It is the chiral smectic $C_A$ phase which an antiferroelectric liquid crystal display device uses.

Figure 11:
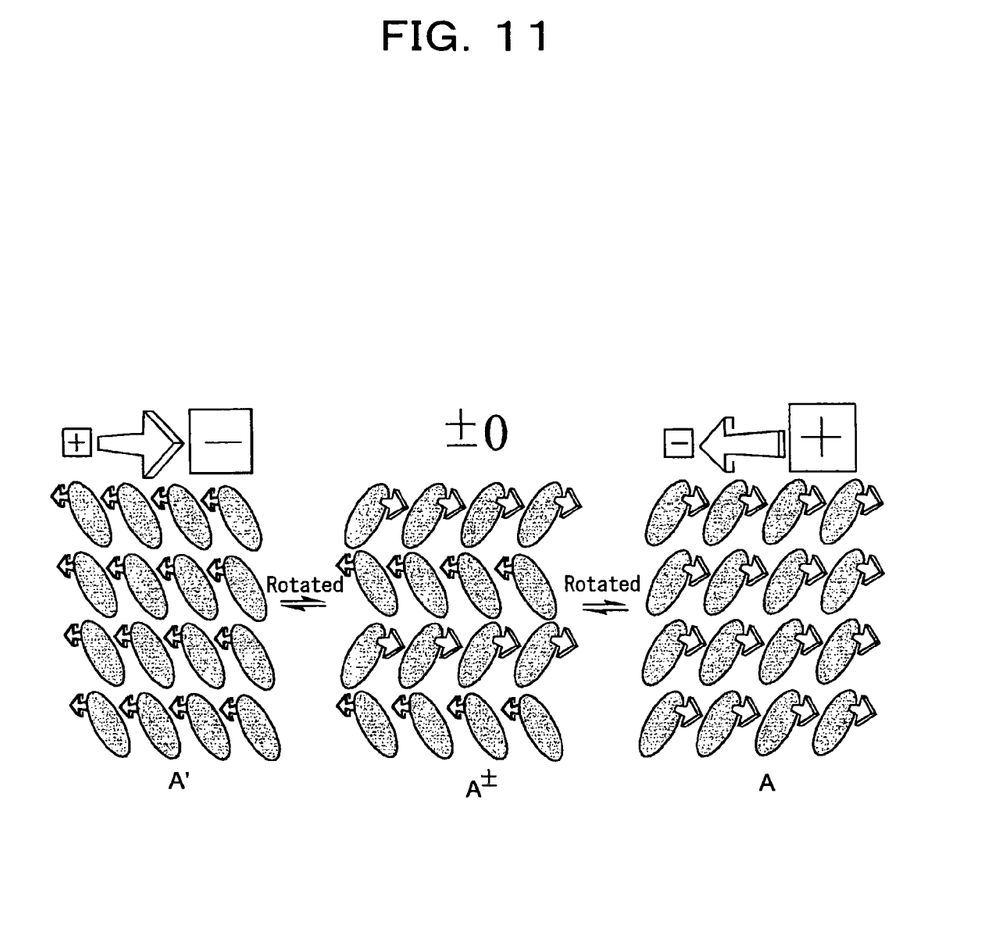
FIG. 11 is a diagram illustrating the principles of operation of a conventional antiferroelectric liquid crystal display device, showing the three stable states of spontaneous polarization.

FIG. 11 is a diagram illustrating the principles of operation of an antiferroelectric liquid crystal display device. An antiferroelectric liquid crystal display device uses the chiral smectic $C_A$ phase, and applying an electric filed to the liquid crystal phase allows light to be switched. As shown in the Figure, in the chiral smectic $C_A$ phase, while it is the same as in the chiral smectic C phase shown in FIG. 10 that liquid crystal molecules are formed in layers, molecules in each layer have their major axes each inclined at a fixed angle to a normal to the layer and the orientation of their spontaneous polarizations are rotated according to the direction is which an electric filed is applied, there is a difference in the state they take when the electric field is removed. Thus, in the state that there is effectively no electric field applied as shown at $A^\pm$, liquid crystal molecules in one layer and those in a next are spontaneously polarized in mutually opposite directions and with these spontaneous polarizations canceled by one another such molecules of the entire body over all the layers as a whole takes an antiferroelectric state. It is seen therefore that in addition to having a high switching speed and a memory function as does a ferroelectric liquid crystal display device, an antiferroelectric liquid crystal display device has three stable states, permitting not only black and white displays but also a halftone display (gray display) to be produced. And, there have also been discovered antiferroelectric liquid crystal materials which allow a gray display to be continuously varied in gray level.

Although antiferroelectric liquid crystals are thus expected to be the most promising for next-generation liquid crystal device materials, there exists the problem that they are hard to manufacture.

To wit, while an antiferroelectric liquid crystal has so far been sought to be made in the belief that a group having a permanent dipole of F or $CF_3$ must be added to a terminal alkyl chain of a smectic $C_A$ liquid crystal molecule, it has been found to be difficult in terms of synthetic techniques to add fluorine species to the smectic $C_A$ liquid crystal molecule. See: Shin Jikken Kagaku Koza (Lectures of New Experimental Chemistry) Maruzen, 14 (Synthesis and Reactions of Organic Compounds) [1], pp 308–331; Gendai Yuuki Kagaku (Modern Organic Chemistry) $3^{rd}$ Ed., authored by K. P. C. Vollhards, N. E. Schore, Kagaku Dojin (chemical coterie), Chapter 6 (Nature & Reactions of Haloalkanes), pp. 242–249 (Effects of Nucleophilicity in $SN_2$ Reactions). Even if one can successfully be synthesized, it often loses properties as the smectic $C_A$ liquid crystal. When an antiferroelectric liquid crystal molecule is sought to be synthesized, an optical isomer thereof is likely to be produced at the same time, which makes it difficult to obtain the antiferroelectric liquid crystal that is 100% optically pure.

Furthermore, now that it has not yet been theoretically elucidated how the molecular assembling state that brings about the antiferroelectric state is formed (see: Kagaku Sosetsu (The Elements of Chemistry) No. 22, (Chemistry of Liquid Crystals) compiled by the Chemical Society of Japan, Society Publishing Center, pp 111–126, Chapter 9 (the Appearance of Ferroelectric, Antiferroelectric and Ferrielectric Phases: by Hideo Takezoe in charge (Fundamentals & New Developments of Research of Liquid Crystal Materials), compiled by (Society of Yong Researchers of Liquid Crystals), Chapter 5: pp 65–102 (Phase Transformation and Optical Texture of Liquid Crystal): by Youichi Takanishi in charge, Chapter 14: pp 229–237 (Antiferroelectric Liquid Crystal Materials): by Yoshio Takano & Hiroyuki Nohira in charge; Handbook of Liquid Crystals edited by D. Demus, J. W. Goodby, G. W. Gray, H. W. Spiess, V. Vill, Vol. 2B, Wiley-VCH Publishing Co. (1998, New York) Chapter 3: Antiferroelectric Liquid Crystals: K. Miyachi, A. Fukuda pp. 665–691; Handbook of Liquid Crystal Research edited by P. J. Collings, J. S. Patel, Ozford University Press Co. (1997, New York), Chapter 2: Chiral and Achiral Calamitic Liquid Crystals for Display Application, A. W. Hall, J. Hollingshurst, J. W. Goodby, pp 47–51), its current molecular design is in a trial and error state and no antiferroelectric liquid crystal that can serve for practical purposes has as yet been synthesized. In fact, during the period of fourteen years that has passed since the discovery of an antiferroelectric crystal, more than 100 types of antiferroelectric liquid crystal have been discovered but any one of them is far in properties from being put to practical use.

DISCLOSURE OF THE INVENTION

In view of the problems mentioned above, it is a first object of the present invention to provide an antiferroelectric liquid crystal that develops antiferroelectricity on the basis of novel principles of operation. It is a second object of the present invention to provide a method of its manufacture.

In order to achieve the first object mentioned above there is provided in accordance with the present invention an antiferroelectric liquid crystal characterized in that it comprises a mixture or compound of a liquid crystal of chiral smectic C-phase molecules with rod-like molecules wherein a said chiral smectic C-phase liquid crystal molecule is formed from a smectic C-phase liquid crystal molecule by substituting a terminal group thereof with an optically active group, and a said rod-like molecule has in a region of its center a permanent dipole moment oriented in a direction of its molecular minor axis, has its molecular major axis that is longer in length than that of the chiral smectic C-phase liquid crystal molecule, is bent in such a central region thereof in the form of character "<" in the Japanese syllabary and has no asymmetric carbon atom.

According to the liquid crystal described, bar-like molecules are exploited that have their molecular major axes longer in length than those of chiralsmectic C-phase liquid crystal molecules and that are each bent in the form of character "<" are thus disposed each to stay across two layers of chiralsmectic C-phase molecules of the liquid crystal.

Also, the "<" bent region of the bar-like, elongate molecule in the form of character "<" is not held within any molecular layer of the smectic C phase but in a boundary layer between two adjacent molecular layers in the smectic C phase. Since the "<" bent bar region is thus held in a boundary layer between two adjacent molecular layers, the permanent dipoles which the bar-like molecules have in their central regions and which are co-oriented with their molecular minor axes are so arrayed as to be disposed in such boundary layers, respectively. Further, according to the least-energy principle for electrostatic energy, the permanent dipole of each bar-like molecule is aligned so its moment is oriented in a boundary direction and perma An antiferroelectric liquid crystal of the present invention which is based on the least-energy principle for electrostatic energy according to the structure of rod-like molecules, makes a variety of smectic C liquid crystal molecular species usable which can be determined by selecting a rod-like molecule that is suitable in configuration. Also, with the advantage that it is easy to introduce an optically active group to a smectic C phase, it is higher in performance and less costly to manufacture than a conventional antiferroelectric liquid crystal which requires introducing a chiral group to a terminal group and a permanent dipole to the chiral group of a smectic $C_A$-phase liquid crystal molecule.

The rod-like molecules may specifically be of a molecular species or compound that is selected from the class which consists of: 2,2-bis-[4-(4-alkoxyphenylcarbonyloxy)phenyl]-1,1,1,3,3,3-hexafluororopane; 2,2-bis[4-(4'-alkoxyphenylcarbonyloxy)phenyl]-1,1,1,3,3,3-hexafluoropropane, 2,2-bis[4-(4-(4-alkoxyphenylcarbonyloxy)carbonyloxy) phenyl]-1,1,1,3,3,3-hexafluoropropane; and 2,2-bis[4-(4-(4'-alkoxyphenylcarbonyloxy) carbonyloxy)phenyl]-1,1,1, 3,3,3-hexafluoropropane.

Also, the smectic C-phase liquid crystal molecules may specifically be a molecular species or compound that is selected from the class which consists of: bis(4-hexyloxyphenyl)terephthalate; telephthal ylidene-bis-4-propoxyaniline; 4-octyloxyphenyl 4'-octyloxybiphenyl-4-carboxylate; 4-octyloxybenzoicacid; and 4-hexyloxyphenyl 4-octyloxyphenyl-4-carboxylate.

The present invention also provides a method of making an antiferroelectric liquid crystal characterized in that it comprises ad mixing or compounding a liquid crystal of chiral smectic C-phase molecules with rod-like molecules wherein a said chiral smectic C-phase liquid crystal molecule is formed from a smectic C-phase liquid crystal molecule by substituting a terminal group thereof with an optically active group; and a said rod-like molecule has in a region of its center a permanent dipole moment oriented in a direction of its molecular minor axis, has its molecular major axis that is longer in length than that of the chiral smectic C-phase liquid crystal molecule, is bent in such a central region thereof in the form of character "<" in the Japanese syllabary and has no asymmetric carbon atom.

The bar-like molecules may specifically be of a molecular species or compound that is selected from the class which consists of: 2,2-bis [4-(4-alkoxyphenyl carbonyl oxy) phenyl]-1, 1,1,3,3,3-hexafluoropropane; 2,2-bis [4-(4'-alkoxyphenyl carbonyl oxy) phenyl]-1,1,1,3,3,3-hexafluoropropane, 2,2-bis [4-(4-(4-alkoxyphenyl carbonyl oxy) carbonyl oxy) phenyl]-1,1, 1,3,3,3-hexafluoropropane; and 2,2-bis [4-(4-(4'-alkoxyphenyl carbonyl oxy) carbonyl oxy) phenyl]-1,1,1,3,3,3-hexafluoropropane.

Also, the smectic C-phase liquid crystal molecules may specifically be a molecular species or compound that is selected from the class which consists of: his (4-hexyloxyphenyl) terephthalate; bis(4-hexyloxyphenyl)telephthalate; telephthalylidene-bis-4-propoxyaniline; 4-octyloxyphenyl-4'-octyloxybiphenyl-4-carboxylate; 4-octyloxybenzoicacid; and 4-hexyloxyphenyl-4-octyloxyphenyl-4-carboxylate.

In accordance with its method of manufacture according to the present invention, an antiferroelectric liquid crystal is produced on the basis of smectic C-phase liquid crystal molecules as described above and is provided that is higher in performance and less costly to manufacture than a conventional antiferroelectric liquid crystal which requires introducing a chiral group to a terminal group and a permanent dipole to the chiral group of a smectic $C_A$-phase liquid crystal molecule.

BRIEF DESCRIPTION OF THE DRAWINGS

The present invention will better be understood from the following detailed description and the drawings attached hereto showing certain illustrative forms of implementation of the present invention. In this connection, it should be noted that such forms of implementation illustrated in the accompanying drawings hereof are intended in no way to limit the present invention but to facilitate an explanation and understanding thereof. In the drawings, FIG. 1 diagrammatically shows a molecular structure of an elongate or rod-like molecule and a molecular structure of a smectic C-phase liquid crystal molecule at (a) and (b), respectively, for use in the preparation of a smectic $C_A$ phase which is in turn for use in an antiferroelectric liquid crystal of the present invention.

BEST MODES FOR CARRYING OUT THE INVENTION

Hereinafter, the present invention will be described in detail with reference to forms of implementation thereof illustrated in the drawing figures.

Noting that the antiferroelectricity of an antiferroelectric liquid crystal of the present invention is based on the interaction of a smectic C-phase liquid crystal molecules with elongate or rod-like molecules each of which has a permanent dipole moment in a region of its center, whose molecular major axis is longer in length than that of the smectic C-phase liquid crystal molecule and which is bent in such a central region in the form of character "<" in the Japanese syllabary, mention is first made of this interaction.

Figure 1:
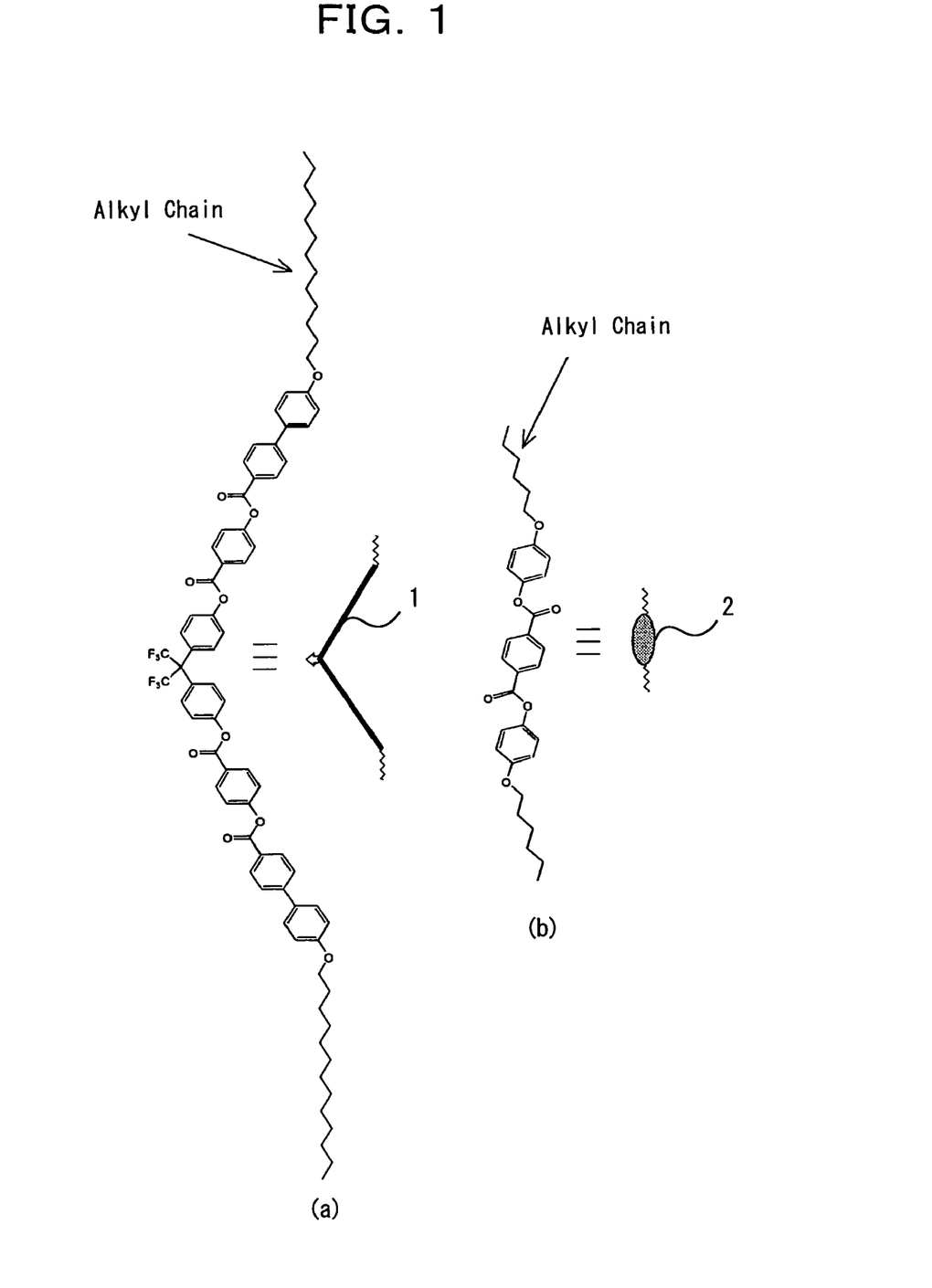

FIG. 1 diagrammatically shows a molecular structure of the elongate or rod-like molecule 1 and a molecular structure of the smectic C-phase liquid crystal molecule 2 at (a) and (b), respectively, for use in the preparation of the smectic $C_A$ phase. As shown in FIG. 1(a), the elongate or rod-like molecule 1 has alkyl groups, benzene rings, carbon atoms and oxygen atoms connected together and running in the form of a bar at a center of which it has two $F_3C$ (fluorocarbon) groups large in permanent dipole moment, the molecule having a large spontaneous polarization in a direction of its molecular minor axis. The rod-like molecule 1 also has a structure in which it is bent about a center of these groups in the form of character "<" in the Japanese syllabary. The molecular major axis of the rod-like molecule 1 is longer in length than the molecular major axis of the smectic C liquid crystal molecule 2 shown in FIG. 1(b).

Shown at the right hand of the structural diagram of the rod-like molecule 1 in FIG. 1(a) is a diagram that symbolically represents the same. The arrow in this symbolic diagram indicates a permanent dipole while the solid lines therein indicate a molecular structure bent in the form of character "<" and each of zigzag lines extending from its opposite ends indicates an alkyl chain. Shown likewise at the right hand of the structural diagram of the smectic C liquid crystal molecule 2 in FIG. 1(b) is a diagram that symbolically represents the same. The ellipse in this symbolic diagram indicates a rigid portion of the molecule 2, including benzene rings and each of zigzag lines extending outwards from the ellipse indicates an alkyl chain. Hereinafter, in designating the molecular structures these symbolic diagrams are used to facilitate understanding operations of the present invention.

The rod-like molecule 1 that can structurally be used need only to have its molecular major axis longer in length than the molecular major axis of the smectic C-phase liquid crystal molecule, to have in a region of its center a permanent dipole moment oriented in a direction of its molecular minor axis and to be in the form of character "<". It need not necessarily be the molecule shown in FIG. 1, however.

Figure 2:
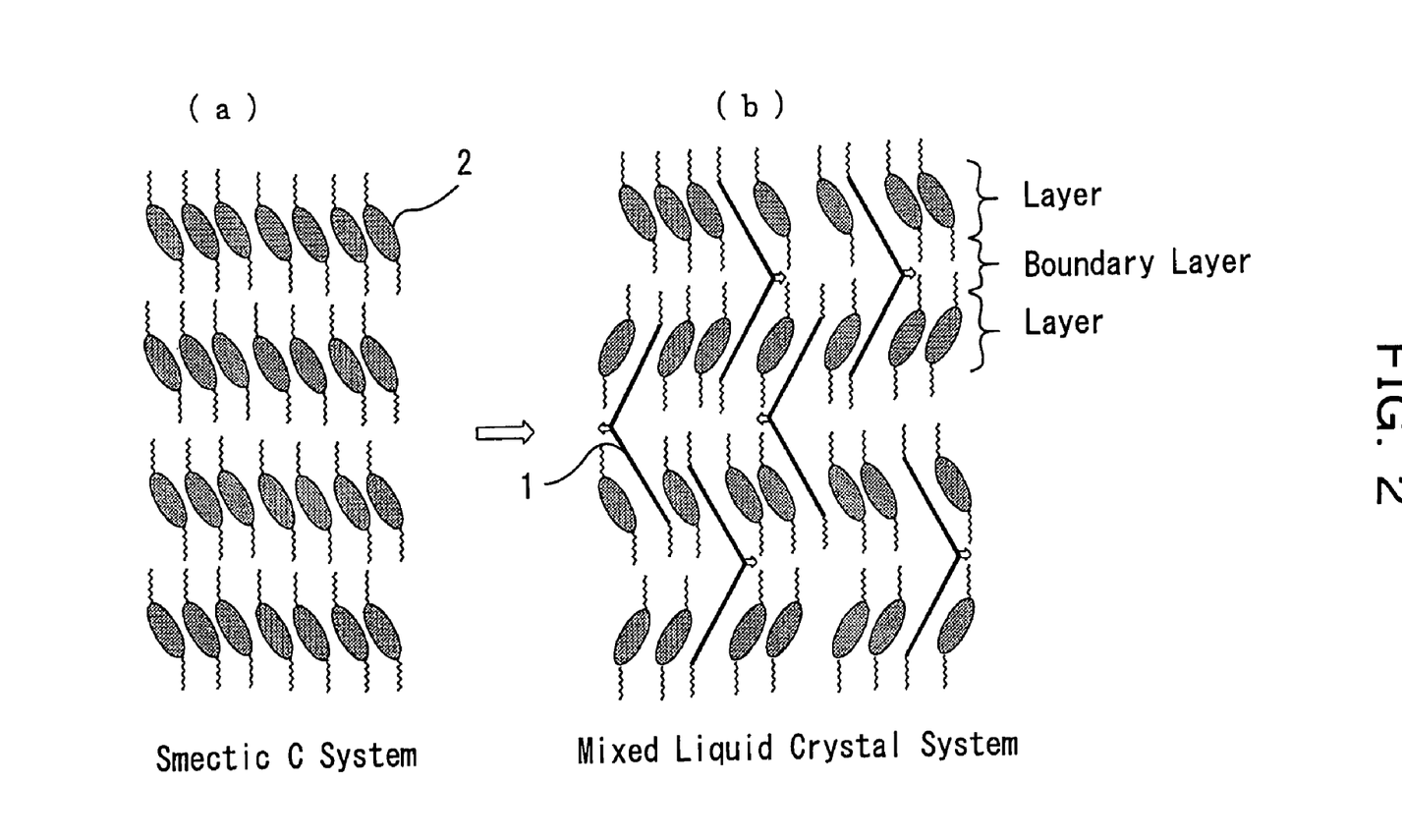
FIG. 2 diagrammatically illustrates the principles whereby the antiferroelectricity develops in an antiferroelectric liquid crystal according to the present invention wherein (a) shows a smectic C liquid crystal and (b) shows a smectic $C_A$ phase formed from the smectic C liquid crystal mixed or compounded with rod-like molecules.

FIG. 2 diagrammatically illustrates the interaction between the rod-like molecule 1 and the smectic C-phase liquid crystal molecule 2 wherein FIG. 2(a) shows the smectic C liquid crystal phase and FIG. 2(b) shows a state that the smectic C liquid crystal phase is compounded with rod-like molecules 1.

As shown in FIG. 2(a), the smectic C liquid crystal phase is configured in layers so that the major axis of a molecule thereof is inclined at a fixed angle to a normal to the layer to which the molecule belongs. If rod-like molecules are mixed or compounded into the smectic C liquid phase where the rod-like molecule has its molecular major axis longer in length than the molecular major axis of the smectic C-phase liquid crystal molecule and is bent in the form of character "<", then each rod-like molecule is held across two molecular layers in the smectic C phase. Then, also, the "<" bent region of the rod-like, elongate molecule in the form of character "<" is not stayed within any molecular layer of the smectic C phase but in a boundary layer between two adjacent molecular layers in the smectic C phase. Since the "<" bent rod region is thus stayed in a boundary layer between two adjacent molecular layers, permanent dipoles of the rod-like molecules are arrayed so they are disposed in such boundary layers, respectively.

Also, the least-energy principle for electrostatic energy requires that the permanent dipole of each rod-like molecule be aligned so its moment is oriented in a boundary direction as shown and that permanent dipoles in adjacent boundary layers be aligned so their moments are oriented in directions opposite to each other as shown. Then, the "<" bent rod regions of the rod-like molecules cause the molecular major axes of liquid crystal to be inclined in the opposite direction every other layer with the result that a smectic $C_A$ phase inclined in the opposite direction every other layer is realized. Accordingly, it is seen that substituting a terminal group of each of the abovementioned smectic C-phase liquid crystal molecules with an optically active group to add a permanent dipole thereto gives rise to a chiral smectic $C_A$ phase, namely an antiferroelectric liquid crystal. Also, noting that the mechanism of forming a smectic $C_A$ phase is based on the least-energy principle for electrostatic energy according to the structure of rod-like molecules, it is seen that selecting a rod-like molecule that is suitable in length allows a variety of smectic C liquid crystals to be converted to corresponding smectic $C_A$ phase liquid crystals.

An antiferroelectric liquid crystal according to the present invention does not use a chiral smectic $C_A$ liquid crystal itself which is hard to manufacture. It rather substitutes it with a chiral smectic C liquid crystal. A chiral smectic C liquid crystal can be manufactured by substituting a terminal group of a smectic C liquid crystal with an optically active group. This method of manufacture is a method that has so far been applied to obtain a ferroelectric liquid crystal (see Furukawa: "(LCD Manufacturing Techniques and Development of High Capacity LCD)", Triceps WS51, compiled by Kobayashi, pp 27 (1987)), and allows a chiral smectic C liquid crystal favorable in properties to be obtained at low cost. When applied to making an antiferroelectric liquid crystal, the conventional method of making a ferroelectric liquid crystal requires that a chiral group be introduced to a smectic $C_A$ liquid crystal molecule and then a permanent dipole to be introduced to the chiral group. According to this method, however, as mentioned above it is extremely hard to so introduce a permanent dipole and if it could successfully be introduced, there would be lost the properties as the smectic $C_A$ liquid crystal. In contrast, using the method of making an antiferroelectric liquid crystal in accordance with the present invention allows it to be manufactured very easily.

Mention is next made of a specific example of the smectic $C_A$ phase according to the present invention.

Figure 3:
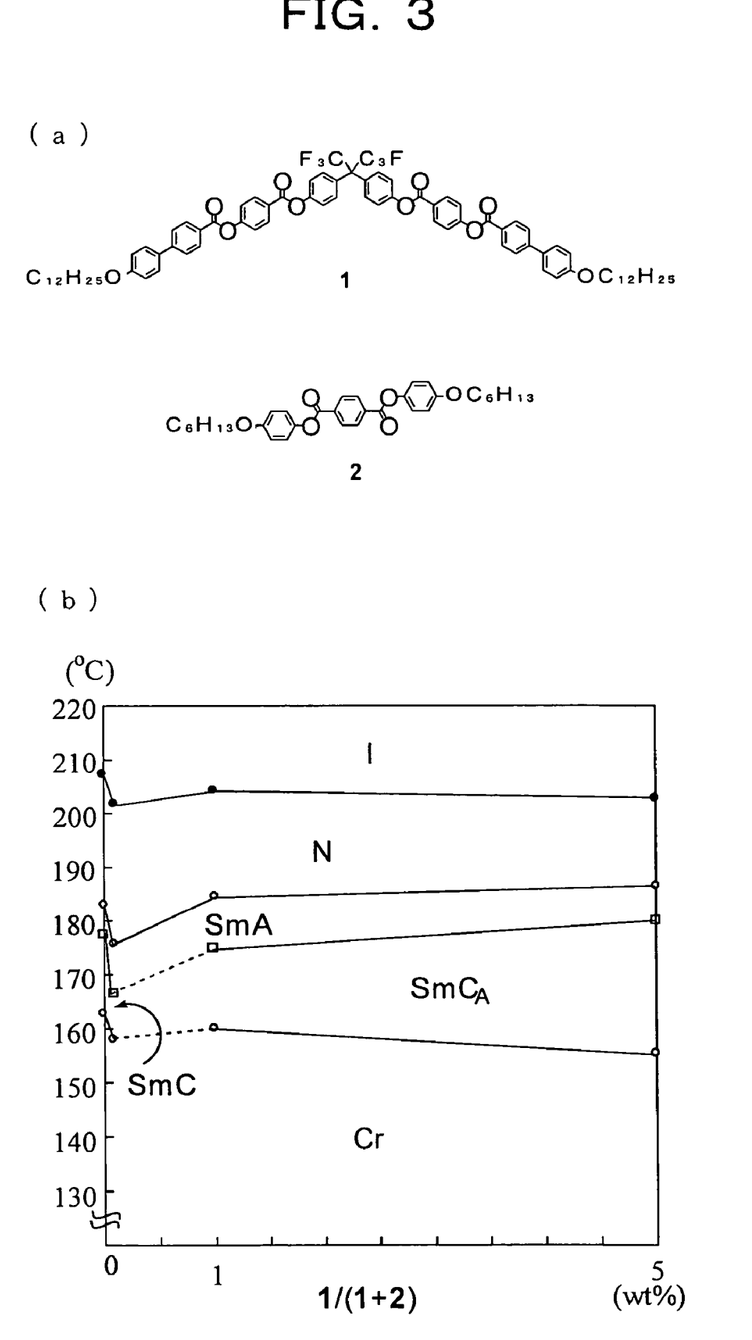
FIG. 3 diagrammatically shows how a smectic $C_A$ phase can be formed according to the method of making an antiferroelectric liquid crystal wherein (a) shows respective molecular structures of rod-like molecule and smectic C liquid crystal used in a specific example and (b) is a phase diagram showing the formation of the smectic $C_A$ phase as determined by polarizing microscopy.

FIG. 3 diagrammatically demonstrates that a smectic C phase liquid crystal 2 is converted with rod-like molecules into a smectic CA phase. FIG. 3(a) shows molecular structures of a rod-like molecule and a smectic C liquid crystal and FIG. 3(b) is a phase diagram showing the formation of the smectic $C_A$ phase liquid crystal as determined by polarizing microscopy. As shown in 3(a) at (1), the rod-like molecule 1 is constituted by 2,2-bis[4-(4-(4'-alkoxyphenyl-carbonyloxy)carbonyl oxy)phenyl]-1,1,1,3,3,3-hexafluoro-propane comprising a pair of bar portions which have at their center a pair of $CF_3$ groups each having a large dipole oriented in a direction of its molecular minor axis, which extend from the $CF_3$ groups rightward and leftward, respectively, and each of which has four (4) benzene rings and five (5) oxygen atoms bonded together in the form of a bar and has an alkyl group ($C_{12}H_{25}$) bonded at its end. It is also shown in FIG. 3(a) at (2) that the smectic C liquid crystal 2 is constituted by bis(4-hexyloxyphenyl) telephthalate.

Rod-like molecules 1 were admixed into the smectic C liquid crystal 2 to form a mixture thereof which was then heated and thereby molten. There resulted a liquid crystal structure of perpendicular orientation and its polarizing microscopy revealed that a smectic $C_A$ phase was formed-.shibano.

In the diagram of FIG. 3(b), the mixing proportion (in % by weight) of the rod-like molecules is plotted along the abscissa axis and the mixture temperature is plotted along the ordinate axis; and I, N, SmA, SmC, $SmC_A$ and Cr indicate isotropic liquid phase, nematic phase, smectic A phase, smectic C phase, smectic $C_A$ phase and crystal, respectively. The solid lines drawn in the diagram plot temperatures and mixing proportions where these phases are bounded by one another. As is apparent from FIG. 3(b), it is seen that adding rod-like molecules in excess of 1% by weight converts the smectic C liquid crystal 2 to the smectic $C_A$ phase liquid crystal.

Figure 4:
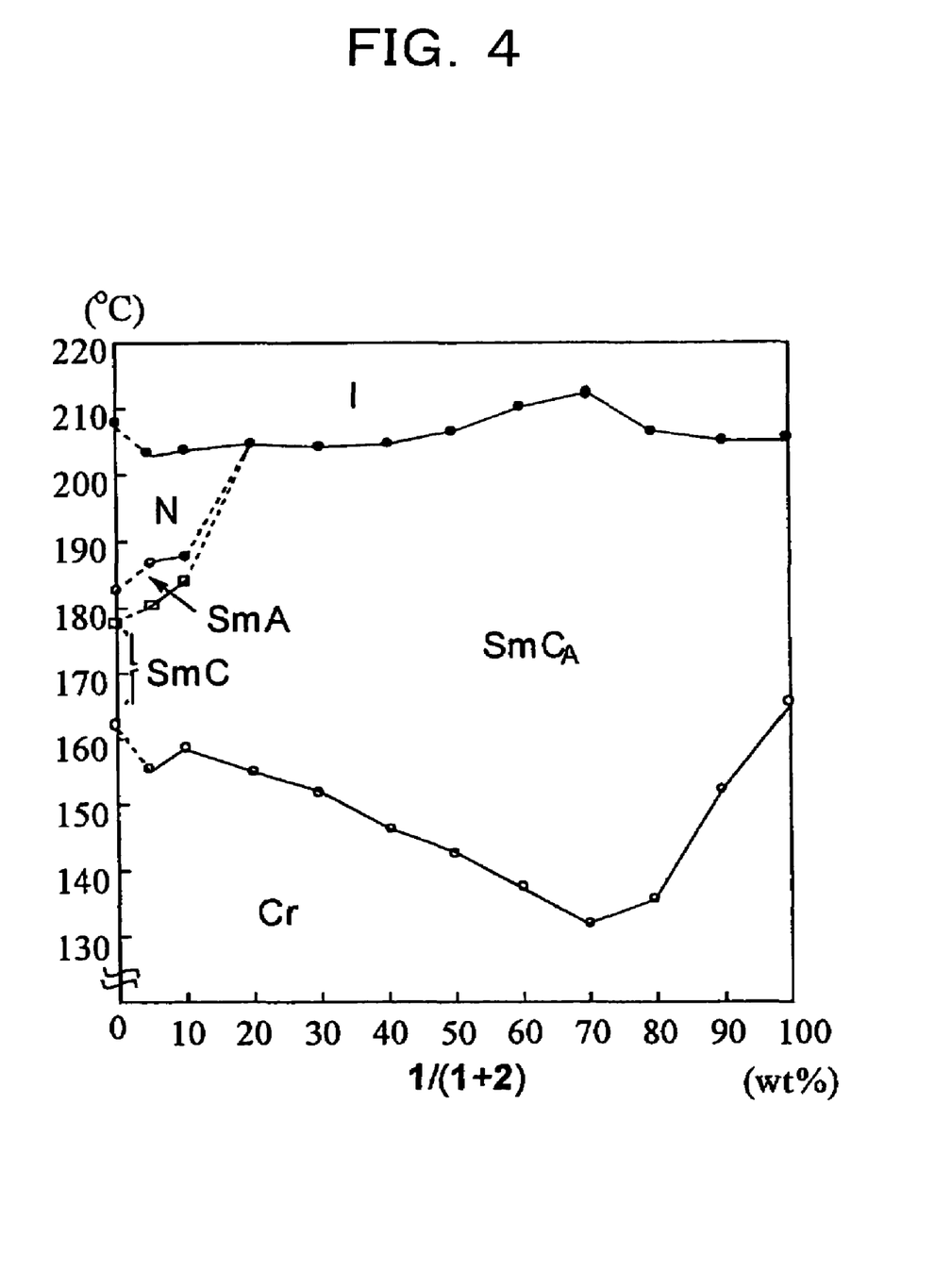
FIG. 4 a phase diagram like that in FIG. 3 except that the mixing proportion of rod-like molecules is extended in range to 100%.

FIG. 4 is a phase diagram of the system where the mixing proportion of rod-like molecules is extended in range to 100%. There were used the same kinds of rod-like molecules 1 and smectic C liquid crystal 2 as in FIG. 3. From FIG. 4 it is seen that the smectic $C_A$ phase appears in an extremely wide range of the mixing proportion.

Figure 5:
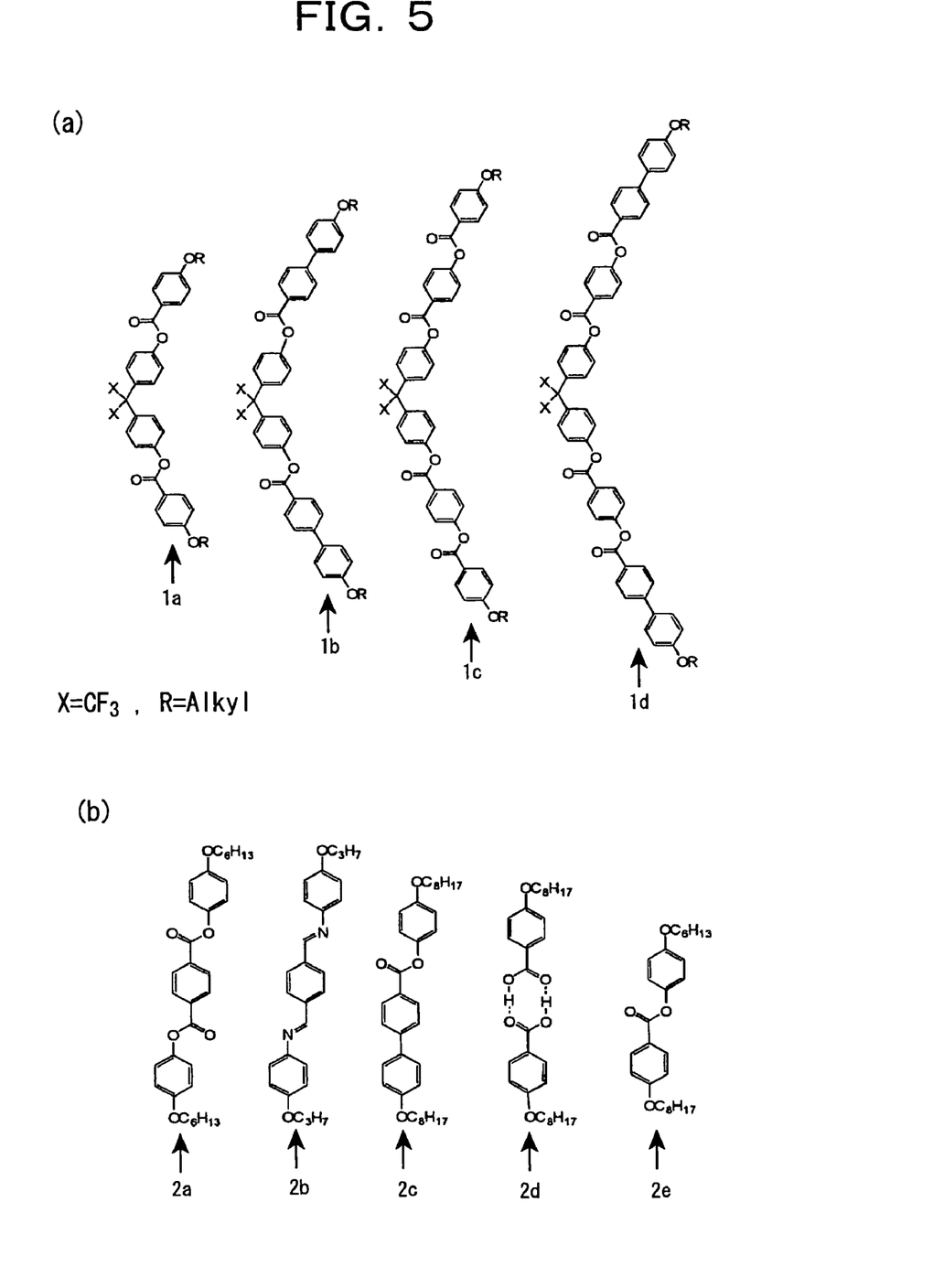
FIG. 5 diagrammatically shows those kinds of rod-like molecule and smectic C liquid crystal which can be used to make a smectic $C_A$ phase wherein (a) and (b) show the molecular structures of such rod-like molecular and smectic C phase species, respectively.

FIG. 5 diagrammatically shows those kinds of rod-like molecule 1 and smectic C liquid crystal 2 which can be used to make a smectic $C_A$ phase wherein (*a*) and (*b*) show the molecular structures of such rod-like and smectic C phase molecular species 1 and 2, respectively.

In FIG. 5(*a*), there are shown:

rod-like molecular structure 1*a* of 2,2-bis[4-(4-alkoxyphenyl carbonyloxy)phenyl]-1,1,1,3,3,3-hexafluoropropane, rod-like molecular structure 1*b* of 2,2-bis[4-(4'-alkoxyphenyl carbonyloxy)phenyl]-1,1,1,3,3,3-hexafluoropropane, rod-like molecular structure 1*c* of 2,2-bis[4-(4-(4-alkoxyphenyl carbonyloxy)carbonyloxy)phenyl]-1,1,1,3,3,3-hexafluoropropane, and rod-like molecular structure 1*d* (shown in FIG. 3(*a*)) of 2,2-bis [4-(4-(4'-alkoxyphenylcarbonyloxy)carbonyloxy) phenyl]-1,1,1,3,3,3-hexafluoropropane.

In FIG. 5(*b*), there are shown:

smectic C phase liquid crystal molecular structure 2*a* (shown in FIG. 3(*a*)) of bis(4-hexyloxyphenyl) telephthalate, smectic C phase liquid crystal molecular structure 2*b* of telephthalylidene-bis-4-propoxyaniline, smectic C phase liquid crystal molecular structure 2*c* of 4-octyloxyphenyl 4'-octyloxybiphenyl-4-carboxylate, smectic C phase liquid crystal molecular structure 2*d* of 4-octyloxybenzoic acid, and smectic C phase liquid crystal molecular structure 2*e* of 4-hexyloxyphenyl 4-octyloxyphenyl-4-carboxylate.

Any possible combination whatsoever of the rod-like molecular and smectic C liquid crystal molecular species or compounds shown in FIGS. 5(*a*) and 5(*b*) can give rise to the formation of a smectic $C_A$ phase liquid crystal.

Nevertheless, all possible combinations as seen from FIG. 5 are by way of example and not limitations. Further, any known suitable technique as mentioned above can be used to add a permanent dipole having chirality to a terminal group of a smectic C phase liquid crystal molecule as shown in FIG. 5(*b*).

Mention is next made of a specific example of the antiferroelectric liquid crystal of the present invention.

Smectic C-phase liquid crystal molecules of bis-(4-hexyloxy phenyl) telephthalate as shown in FIG. 3 were used. The two identical alkyl groups $C_6H_{13}$ at the ends of such a smectic C-phase liquid crystal molecule were substituted with two different optically active groups $CH_3(CH_2)_{11}$ and $CH(CH_3)(CH_2)_5CH_3$, respectively, to yield a substance called (R)-1-methylheptyl 4-(4-dodecyloxyphenylcarbonyl oxy)benzoate which is a chiral smectic C crystal (ferroelectric liquid crystal) having chiral permanent dipoles at its terminals (for the sake of simplicity, this substance will hereinafter be referred to as "chemical compound A").

Figure 6:
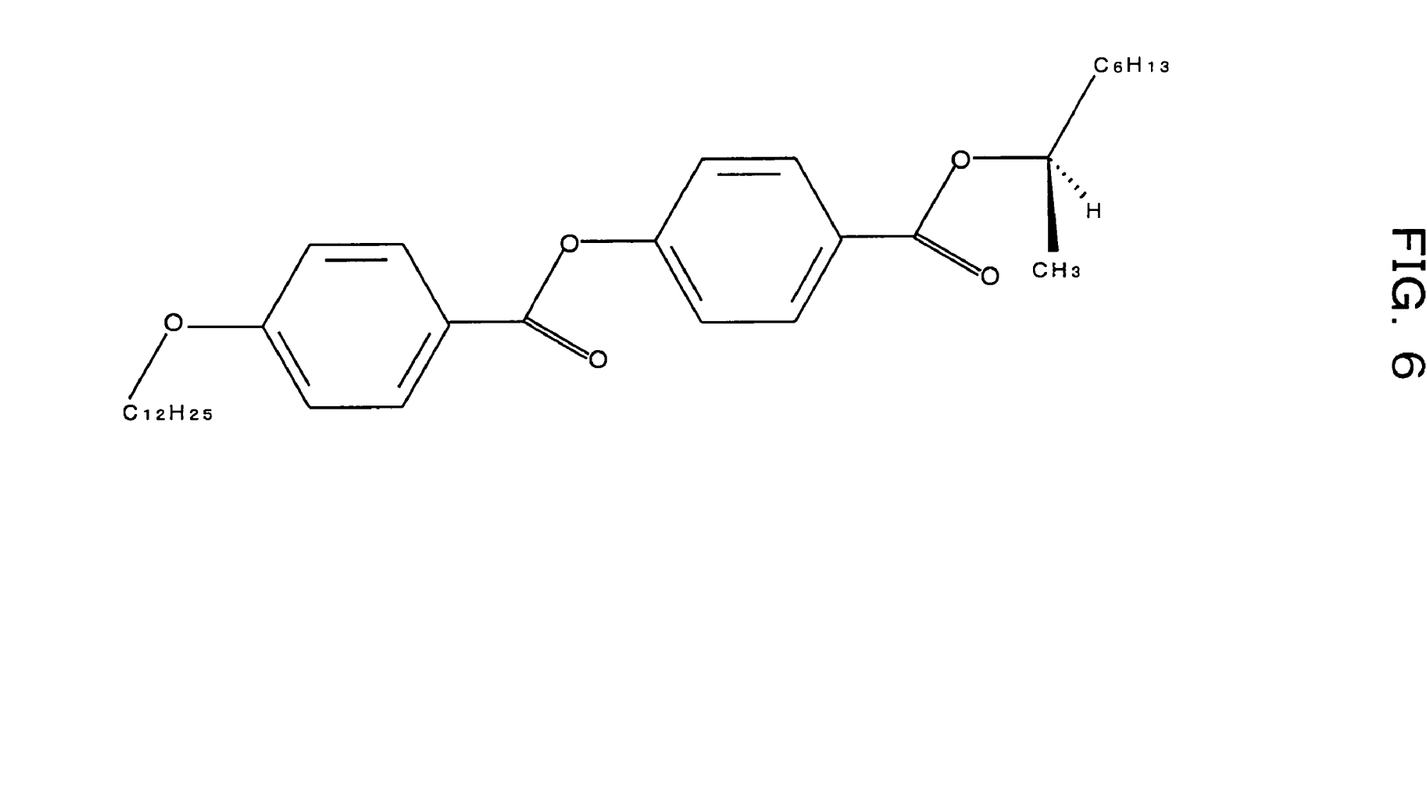
FIG. 6 is a diagram showing the molecular structure of compound A having optically active groups substituted for terminal groups of a smectic C liquid crystal molecule.

FIG. 6 is a diagram showing the molecular structure of this chemical compound A having the optically active groups substituted for the terminal groups of the smectic C liquid crystal molecule. The compound A when raised in temperature changes its phase from crystal to isotropic liquid and when lowered in temperature exhibits smectic A phase at 41° C. and chiral smectic C phase at 24° C. and is crystallized at 11° C.

The chemical compound A was held between a pair of transparent electrode glass substrates of 10 mm×10 mm wide and had a triangular voltage (±100 V) applied across the glass substrates at a frequency of 0.26 Hz when its temperature was lowered to 20° C. to measure its voltage and current characteristics. Then, the glass substrates had a treatment of horizontal orientation applied thereto and had a spacing of 5 μm between them.

Figure 7:
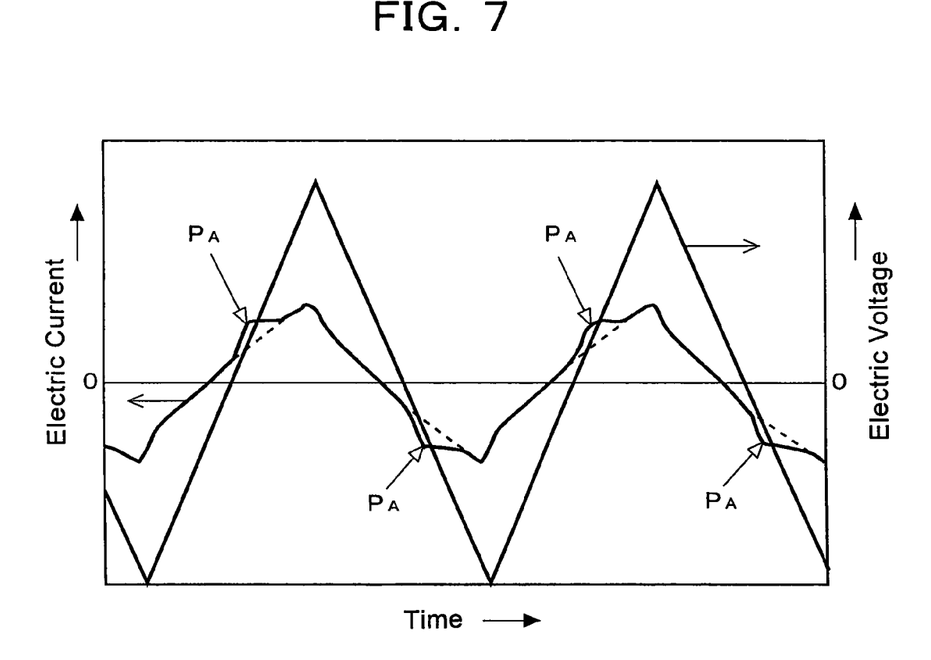
FIG. 7 is a diagram illustrating voltage and current characteristics of chemical compound A having optically active groups substituted for terminal groups of each of such smectic C liquid crystal molecules.

FIG. 7 is a diagram illustrating voltage and current characteristics of the chemical compound A. In the diagram, time is plotted along the abscissa axis, and voltage and current are plotted along the right and left hand side ordinates, respectively. As can be seen from the diagram, a current peak $P_A$ appears periodically at the frequency of the applied voltage. This characteristic is representative of a ferroelectric liquid crystal. Each peak $P_A$ is a displacement current component that appears as the spontaneous polarization in the chemical compound A as a ferroelectric liquid crystal is rotated as can be seen from FIG. 10(*b*). From the area of a region surrounded with a portion of the current curve containing each peak $P_A$ and its intersecting broken line in the diagram, the magnitude of the spontaneous polarization can be found and is found to be 82 nC/cm².

Next, the chemical compound A had added thereto 2% by weight of rod-like molecules shown in FIG. 3(*a*), namely, 2,2-bis-[4-(4-(4'-alkoxyphenylcarbonyloxy) carbonyloxy) phenyl]-1,1,1,3,-3,-3-hexafluoropropane (referred to hereinafter as "rod-like molecules" for the sake of simplicity), and measurements as in FIG. 7 were performed. Then, the triangular voltage had a peak-to-valley value of ±55 volts and a frequency of 0.12 Hz.

Figure 8:
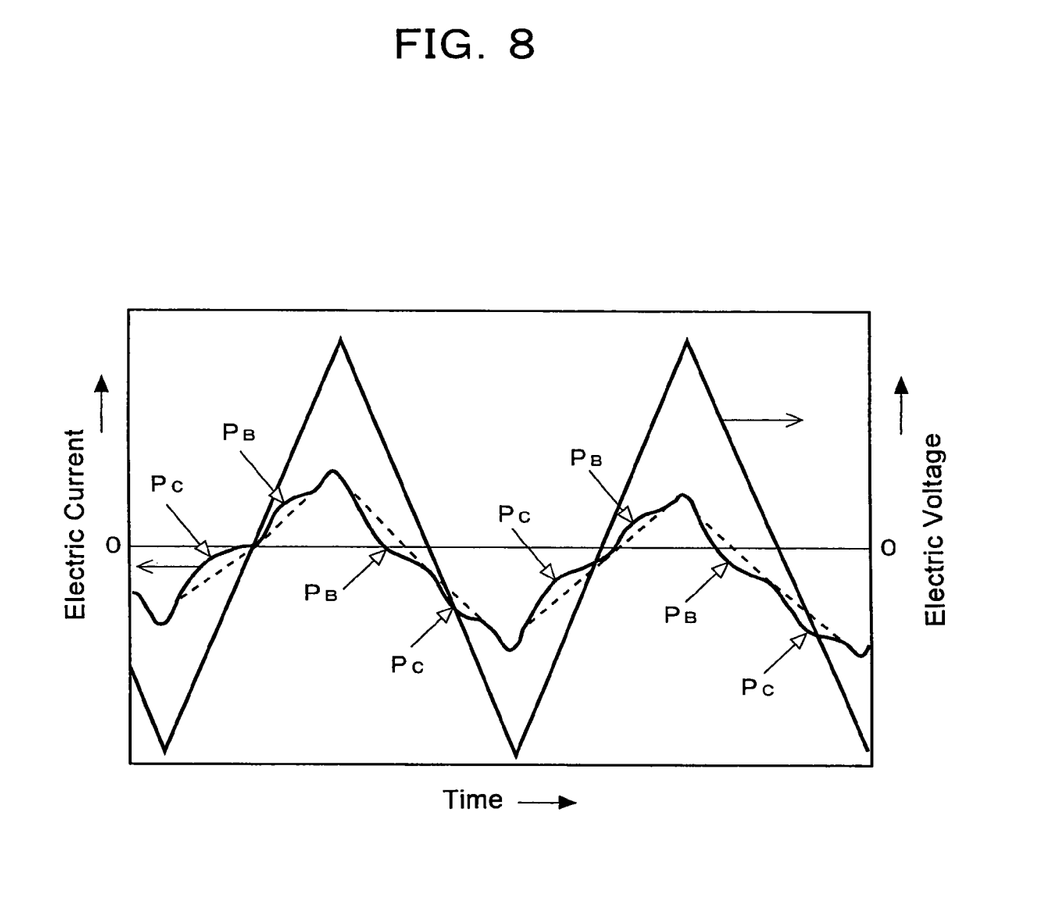
FIG. 8 is a diagram illustrating voltage and current characteristics of a mixture of chemical compound A having optically active groups substituted for terminal groups of each of such smectic C liquid crystal molecules having added thereto rod-like molecules.

FIG. 8 is a diagram illustrating voltage and current characteristics of the chemical compound A having such rod-like molecules 1 added thereto. In the diagram, time is plotted along the abscissa axis, and voltage and current are plotted along the right and left hand side ordinates, respectively. As can be seen from the diagram, two current peaks $P_B$ and $P_C$ occur successively in a region where the applied voltage becomes zero, and appear periodically at the frequency of the applied voltage.

As is apparent from FIG. 10 (11), in an antiferroelectric liquid crystal having a stable antiferroelectric state at the applied voltage of 0 where spontaneous polarizations in one layer are opposite in the direction of orientation to those in a layer next, one half of the spontaneous polarizations in all the layers are inverted when transition occurs from the state A' that the voltage is applied from the back towards the front of the sheet of paper to the state $A^±$ that the voltage is zero and the other half of the spontaneous polarizations in all the layers are inverted when transition occurs from the state $A^±$ that the voltage is zero to the state A that the voltage is applied from the front towards the back of the sheet of paper. Thus, if a triangular voltage as mentioned above is applied, then in the neighborhood of the applied voltage being zero there occur two peaks as a result of these two inventions of spontaneous polarizations. The two peaks $P_B$ and $P_C$ that appear in FIG. 8 correspond to these two transitions in an antiferroelectric liquid crystal. The sum of the magnitude of spontaneous polarizations found from the area of a region surrounded with a portion of the current curve containing each first peak $P_B$ and its intersecting broken line and the area of a region surrounded with a portion of the current curve containing each second peak $P_C$ and its intersecting broken line in the diagram is found to be 87 nC/cm², which substantially agrees with the magnitude: 82 nC/cm² of spontaneous magnetizations in a ferroelectric liquid crystal found in FIG. 7.

From these results, it is seen that mixing or compounding a ferroelectric liquid crystal formed of smectic C-phase liquid crystal molecules with rod-like molecules gives rise to the formation of an antiferroelectric liquid crystal in accordance with the present invention.

Although the present invention has hereinbefore been set forth with respect to certain illustrative embodiments thereof, it will readily be appreciated to be obvious to those skilled in the art that many alterations thereof, omissions therefrom and additions thereto can be made without departing from the essences of scope of the present invention. Accordingly, it should be understood that the invention is not intended to be limited to the specific embodiments thereof set forth above, but to include all possible embodiments that can be made within the scope with respect to the features specifically set forth in the appended claims and to encompass all the equivalents thereof.

INDUSTRIAL APPLICABILITY

As will be appreciated from the foregoing description, the present invention makes it possible to obtain a chiral smectic $C_A$ liquid crystal simply by mixing or compounding rod-like molecules into a chiral smectic C liquid crystal that is easy to manufacture and hence to provide at low cost an antiferroelectric liquid crystal that has so far been hard to manufacture.

What is claimed is:

1. An antiferroelectric liquid crystal, characterized in that it comprises a mixture of a liquid crystal of chiral smectic C-phase molecules with rod-like molecules wherein a said chiral smectic C-phase liquid crystal molecule is formed from a smectic C-phase liquid crystal molecule by substituting a terminal group thereof with an optically active group; and a said rod-like molecule has in a region of its center a permanent dipole moment oriented in a direction of its molecular minor axis, has its molecular major axis that is longer in length than that of the chiral smectic C-phase liquid crystal molecule, is bent in such a central region thereof in the form of character "<" in the Japanese syllabary and has no asymmetric carbon atom.

2. An antiferroelectric liquid crystal as set forth in claim 1, characterized in that said rod-like molecules are of a molecular species selected from the class which consists of:
   2,2-bis[4-(4-alkoxyphenylcarbonyloxy) phenyl]-1,1,1,3,3,3-hexafluoropropane,
   2,2-bis[4-(4'-alkoxyphenylcarbonyloxy) phenyl]-1,1,1,3,3,3-hexafluoropropane,
   2,2-bis[4-(4-(4-alkoxyphenylcarbonyloxy) carbonyloxy) phenyl]-1,1,1,3,3,3-hexafluoropropane, and
   2,2-bis[4-(4-(4'-alkoxyphenylcarbonyloxy) carbonyloxy) phenyl]-1,1,1,3,3,3-hexafluoropropane.

3. An antiferroelectric liquid crystal as set forth in claim 1, characterized in that said smectic C-phase liquid crystal molecules are of a molecular species selected from the class which consists of:
   bis(4-hexyloxyphenyl) telephthalate,
   telephthal ylidene-bis-4-propoxy aniline,
   4-octyloxyphenyl-4'-octyloxybiphenyl-4-carboxylate,
   4-octyloxybenzoic acid, and
   4-hexyloxyphenyl-4-octyloxyphenyl-4-carboxylate.

4. A method of making an antiferroelectric liquid crystal, characterized in that it comprises admixing a liquid crystal of chiral smectic C-phase molecules with rod-like molecules wherein a said chiral smectic C-phase liquid crystal molecule is formed from a smectic C-phase liquid crystal molecule by substituting a terminal group thereof with an optically active group; and a said rod-like molecule has in a region of its center a permanent dipole moment oriented in a direction of its molecular minor axis, has its molecular major axis that is longer in length than that of the chiral smectic C-phase liquid crystal molecule, is bent in such a central region thereof in the form of character "<" in the Japanese syllabary and has no asymmetric carbon atom.

5. A method of making an antiferroelectric liquid crystal as set forth in claim 4, characterized in that said rod-like molecules are of a molecular specie selected from the class which consists of:
   2,2-bis[4-(4-alkoxyphenylcarbonyloxy) phenyl]-1,1,1,3,3,3-hexafluoropropane,
   2,2-bis[4-(4'-alkoxyphenylcarbonyloxy) phenyl]-1,1,1,3,3,3-hexafluoropropane,
   2,2-bis[4-(4-(4-alkoxyphenylcarbonyloxy) carbonyloxy) phenyl]-1,1,1,3,3,3-hexafluoropropane, and
   2,2-bis[4-(4-(4'-alkoxyphenylcarbonyloxy) carbonyloxy) phenyl]-1,1,1,3,3,3-hexafluoropropane.

6. A method of making an antiferroelectric liquid crystal as set forth in claim 4, characterized in that said smectic C-phase liquid crystal molecules are of a molecular species selected from the class which consists of:
   bis(4-hexyloxyphenyl) telephthalate,
   telephthal ylidene-bis-4-propoxy aniline,
   4-octyloxyphenyl-4'-octyloxybiphenyl-4-carboxylate,
   4-octyloxybenzoic acid, and
   4-hexyloxyphenyl-4-octyloxyphenyl-4-carboxylate.

* * * * *